US011874075B2

United States Patent
Endo et al.

(10) Patent No.: US 11,874,075 B2
(45) Date of Patent: Jan. 16, 2024

(54) HEAT EXCHANGER

(71) Applicant: HONDA MOTOR CO., LTD., Tokyo (JP)

(72) Inventors: Tsuneo Endo, Saitama (JP); Katsutoshi Tada, Saitama (JP); Hitomi Ito, Saitama (JP); Yuta Kurosawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 6 days.

(21) Appl. No.: 17/677,328

(22) Filed: Feb. 22, 2022

(65) Prior Publication Data
US 2022/0316819 A1 Oct. 6, 2022

(30) Foreign Application Priority Data
Mar. 30, 2021 (JP) .................. 2021-056701

(51) Int. Cl.
F28F 7/02 (2006.01)
F28F 13/08 (2006.01)
F28D 7/08 (2006.01)
B33Y 80/00 (2015.01)

(52) U.S. Cl.
CPC ................. F28F 7/02 (2013.01); F28D 7/08 (2013.01); F28F 13/08 (2013.01); B33Y 80/00 (2014.12)

(58) Field of Classification Search
CPC . F28D 9/0037; F28F 7/02; F28F 3/025; F28F 2250/108
See application file for complete search history.

(56) References Cited

U.S. PATENT DOCUMENTS

| 2002/0174979 A1 | 11/2002 | Haegele et al. |
| 2017/0023311 A1 | 1/2017 | Urbanski |
| 2021/0348856 A1 | 11/2021 | Fujiwara |

FOREIGN PATENT DOCUMENTS

| CN | 101027531 A | 8/2007 | |
| DE | 10329153 A1 * | 1/2005 | ........... F28D 9/0037 |
| EP | 844454 A1 * | 5/1998 | ........... F28D 9/0037 |
| JP | H10259991 A | 9/1998 | |
| JP | 2007518053 A | 7/2007 | |

(Continued)

OTHER PUBLICATIONS

Notice of Reasons for Refusal for Japanese Patent Application No. 2021-056701 dated Dec. 20, 2022; 8 pp.

*Primary Examiner* — Eric S Ruppert
(74) *Attorney, Agent, or Firm* — Armstrong Teasdale LLP (57) ABSTRACT

A heat exchanger includes a main body provided with first flow paths through which a first fluid flows and second flow paths through which a second fluid flows. Each first flow path includes an integrated part, a buffer part, and a divided part arranged in this order from an inlet of the main body. The integrated part includes a first flow path space defined by a peripheral wall including a pair of mutually facing partition walls. The buffer part includes a deformed flow path space formed by deforming the first flow path space such that first displacement parts or each of multiple pairs of first displacement parts provided at intervals on the pair of partition walls approach each other. The divided part includes multiple divided flow path spaces formed by dividing the first flow path space by connecting the first displacement parts of each pair to each other.

14 Claims, 6 Drawing Sheets (56) References Cited

FOREIGN PATENT DOCUMENTS

| | | |
|---|---|---|
| JP | 2014020608 A | 2/2014 |
| JP | 2020046161 A | 3/2020 |
| WO | 2015016726 A1 | 2/2015 |

* cited by examiner

HEAT EXCHANGER

TECHNICAL FIELD

The present invention relates to a heat exchanger in which a flow path structure for a fluid that undergoes heat exchange varies according to the position in the flow path.

BACKGROUND ART

Conventionally, heat exchangers using various heat transfer methods are widely used as devices for exchanging heat between multiple fluids of different temperatures. To improve the heat exchange efficiency in the heat exchangers, in some heat exchanges that have been developed, the flow path structure for the fluid (the shape, surface area, and the like of the flow path) is varied according to the position in the flow path (fluid route).

For example, there is known a heat exchanger in which fins forming a flow path having a large heat transfer area and/or a flow path with a high Reynolds number are disposed on a low temperature side to enhance the heat exchange efficiency of the heat exchanger, and fins forming a flow path having a small heat transfer area and/or a flow path with a low Reynolds number are disposed on a high temperature side to reduce a pressure drop (see JPH10-259991A).

Also, for example, there is known a heat exchanger provided with multiple tubular flow paths including multiple first flow paths configured to allow a first fluid to flow therethrough and multiple second flow paths configured to allow a second fluid that exchanges heat with the first fluid to flow therethrough, wherein a position and an outer shape of each of the tubular flow paths in a cross section orthogonal to a predetermined direction (extension direction of the flow path) vary according to a position of each flow path in the predetermined direction (see JP2020-46161A).

In the case where the heat transfer area is varied according to the position in the flow path for fluid as in the conventional technology described in JPH10-259991A mentioned above, if multiple divided flow paths connected to a single flow path are formed to increase the heat transfer area, non-uniform flow may occur at a boundary between the single flow path and the multiple divided flow paths due to disturbance and/or stay of flow.

Also, if the shape of the flow path is varied in the heat exchanger in a complicated manner as in the conventional technology described in JP2020-46161A mentioned above, the pressure loss of the fluid may increase.

SUMMARY OF THE INVENTION

In view of the foregoing background, a primary object of the present invention is to provide a heat exchanger in which the flow path structure is configured to vary according to the position in the flow path for fluid and which can improve the heat exchange efficiency while suppressing occurrence of non-uniform flow of fluid and pressure loss.

To achieve the above object, one aspect of the present invention provides a heat exchanger (1) comprising: a main body (7); multiple first flow paths (21) provided in the main body such that a first fluid (7) flows therethrough; and multiple second flow paths (23) provided in the main body such that a second fluid (5) that exchanges heat with the first fluid flows therethrough, wherein each first flow path includes an integrated part (31), a buffer part (32), and a divided part (33) that are arranged in this order from an inlet (25) for the first fluid of the main body in a first flow direction, the integrated part includes a single first flow path space defined by a peripheral wall that includes a pair of partition walls (41, 41) disposed to face each other in a cross section perpendicular to or intersecting with the first flow direction, the buffer part includes a single deformed flow path space formed by deforming the first flow path space such that first displacement parts (45A) of each of multiple pairs of first displacement parts that are provided at intervals on the pair of partition walls approach each other in a cross section perpendicular to or intersecting with the first flow direction, and the divided part includes multiple divided flow path spaces formed by dividing the first flow path space in a cross section perpendicular to or intersecting with the first flow direction by connecting the first displacement parts of each pair of first displacement parts to each other.

According to this aspect, each of the multiple flow paths for fluid (the multiple first flow paths through which the first fluid flows) is formed with the integrated part that suppresses the pressure loss owing to the relatively wide flow path space (first flow path space), the divided part that improves the heat exchange efficiency owing to the relatively large heat transfer area, and the buffer part that suppresses occurrence of non-uniform flow caused by transition from the integrated part to the divided part (namely, change of the flow path structure). Thereby, according to this aspect, in the heat exchanger in which the flow path structure is configured to vary according to the position in the flow path for fluid, the heat exchange efficiency can be improved while occurrence of non-uniform flow of fluid and pressure loss can be suppressed.

In the above aspect, preferably, the integrated parts, the buffer parts, the divided parts, or a combination thereof are included in an arbitrary cross section of the main body perpendicular to the first flow direction, and the closer the arbitrary cross section is to the inlet for the first fluid, the greater a ratio of an area occupied by the integrated parts in the arbitrary cross section is.

According to this aspect, in a part of each first flow path close to the inlet for the first fluid, the integrated part secures a wide flow path space, whereby the introduction of the fluid (the first fluid) into the main body becomes easy and the fluid can be introduced into the main body uniformly over a wide range.

In the above aspect, preferably, the multiple second flow paths include second flow path spaces defined by surfaces of the pairs of partition walls opposite from the respective first flow paths, and the second fluid is supplied in a second flow direction perpendicular to the first flow direction from an inlet for the second fluid communicating with the second flow path spaces in the main body.

According to this aspect, each of the multiple first flow paths can be formed with the integrated part, the buffer part, and the divided part without complicating the structure of the multiple second flow paths.

In the above aspect, preferably, when at least the integrated parts and the buffer parts are included in the arbitrary cross section of the main body, the integrated parts are disposed closer to the inlet for the second fluid than the buffer parts are, and when the integrated parts, the buffer part, and the divided parts are included in the arbitrary cross section of the main body, the integrated parts and the buffer parts are disposed closer to the inlet for the second fluid than the divided parts are.

According to this aspect, in a region positioned adjacent to the inlet for the second fluid, the integrated part of each first flow path secures a wide flow path space, whereby smooth flow of the first fluid can be ensured and as a result, the heat exchange between the first fluid and the second fluid can be promoted.

In the above aspect, preferably, the inlet for the second fluid is provided in a part of the main body adjacent to the inlet for the first fluid which is an upstream side in the first flow direction, and when at least the buffer parts are included in the arbitrary cross section of the main body, the closer the arbitrary cross section is to the inlet for the first fluid, the more distant the buffer parts are disposed from the inlet for the second fluid.

According to this aspect, in a region distant from the inlet for the second fluid, the buffer part of each first flow path positioned near the inlet for the first fluid suppresses occurrence of non-uniform flow, while in a region close to the inlet for the second fluid, the buffer part of each first flow path positioned distant from the inlet for the first fluid enhances the directivity of the flow of the first fluid, whereby occurrence of turbulence and pressure loss in the first fluid can be suppressed.

In the above aspect, preferably, each buffer part is formed to have substantially a same length in the first flow direction over an entirety of the main body in a direction perpendicular to the first flow direction.

According to this aspect, the effect of the buffer part (namely, the effect of suppressing occurrence of non-uniform flow due to transition from the integrated part to the divided part in the first flow path) can be obtained uniformly in the direction perpendicular to the first flow direction in the first flow path, and this improves the homogeneity of the flow of the first fluid.

In the above aspect, preferably, each second flow path space includes a part extending from the inlet for the second fluid over an entirety of the main body in the second flow direction.

According to this aspect, the second fluid can be guided smoothly from the inlet over the entirety of the main body in the second flow direction.

In the above aspect, preferably, the main body is provided with one or multiple dividing walls (51-53) perpendicular to or intersecting with the first flow direction so as to divide the multiple second flow path spaces in the first flow direction.

According to this aspect, the second fluid can be introduced into the main body uniformly in the direction perpendicular to or intersecting with the first flow direction.

In the above aspect, preferably, the multiple partition walls are formed such that lengths thereof become shorter toward the first flow direction from a side of the inlet for the first fluid of the main body.

According to this aspect, it is possible to make the second fluid flow more uniformly within the main body in the direction perpendicular to the first flow direction.

In the above aspect, preferably, each first flow path includes another integrated part and another buffer part arranged in this order from an outlet for the first fluid of the main body in a direction opposite to the first flow direction.

According to this aspect, discharge of the fluid (the first fluid) from the main body becomes easy and the fluid can be discharged from the main body uniformly over a wide range.

In the above aspect, preferably, the buffer part includes the single deformed flow path space formed by deforming the first flow path space such that second displacement parts (45B) of each of multiple pairs of second displacement parts that are provided at intervals on the pair of partition walls depart from each other in a cross section perpendicular to or intersecting with the first flow direction.

According to this aspect, in the case where each of the multiple first flow paths is formed with the integrated part, the buffer part, and the divided part, it is possible to suppress fluctuation in volume of the flow path at each of these parts.

In the above aspect, preferably, each divided flow path space has a shape of a rectangle in a cross section perpendicular to or intersecting with the first flow direction, and each pair of first displacement parts and each pair of second displacement parts are provided at positions corresponding to two sets of opposite corners of the rectangle, respectively.

According to this aspect, the variation of the fluid flow path structure including the integrated part, the buffer part, and the divided part can be easily realized.

In the above aspect, preferably, in the integrated part, the pair of partition walls extend linearly and are disposed parallel to each other in a cross section perpendicular to or intersecting with the first flow direction.

According to this aspect, the integrated part of each first flow path can be realized by a simple configuration.

In the above aspect, preferably, the main body is provided with projections protruding from surfaces of the pairs of partition walls opposite from the respective first flow paths so as to divide the multiple second flow path spaces in the first flow direction.

According to this aspect, the second fluid can be introduced into the main body uniformly in the first flow direction.

To achieve the above object, another aspect of the present invention provides a heat exchanger (1) comprising: a main body (7); multiple first flow paths (21) provided in the main body such that a first fluid (7) flows therethrough; and multiple second flow paths (23) provided in the main body such that a second fluid (5) that exchanges heat with the first fluid flows therethrough, wherein each first flow path includes an integrated part (31), a buffer part (32), and a divided part (33) that are arranged in this order from an outlet for the first fluid of the main body in a direction opposite to a first flow direction which is a flow direction of the first fluid, the integrated part includes a single first flow path space defined by a peripheral wall that includes a pair of partition walls (41, 41) disposed to face each other in a cross section perpendicular to or intersecting with the first flow direction, the buffer part includes a single deformed flow path space formed by deforming the first flow path space such that first displacement parts (45A) of each of multiple pairs of first displacement parts that are provided at intervals on the pair of partition walls approach each other in a cross section perpendicular to or intersecting with the first flow direction, and the divided part includes multiple divided flow path spaces formed by dividing the first flow path space in a cross section perpendicular to or intersecting with the first flow direction by connecting the first displacement parts of each pair of first displacement parts to each other.

According to this aspect, each of the multiple flow paths for fluid (the multiple first flow paths through which the first fluid flows) is formed with the integrated part that suppresses the pressure loss owing to the relatively wide flow path space (first flow path space), the divided part that improves the heat exchange efficiency owing to the relatively large heat transfer area, and the buffer part that suppresses occurrence of non-uniform flow caused by transition from the divided part to the integrated part (namely, change of the flow path structure). Thereby, according to this aspect, in the heat exchanger in which the flow path structure is configured to vary according to the position in the flow path for fluid, the heat exchange efficiency can be improved while occurrence of non-uniform flow of fluid and pressure loss can be suppressed.

According to the foregoing configuration, it is possible to provide a heat exchanger in which the flow path structure is configured to vary according to the position in the flow path for fluid and which can improve the heat exchange efficiency while suppressing occurrence of non-uniform flow of fluid and pressure loss.

DETAILED DESCRIPTION OF THE INVENTION

In the following, a heat exchanger according to an embodiment of the present invention will be described with reference to the drawings. For convenience of explanation, the vertical, fore and aft, and lateral directions are defined as indicated by arrows in FIG. 1, etc. It is to be noted, however, that the arrangement of the heat exchanger is not limited to these directions.

Figure 1:
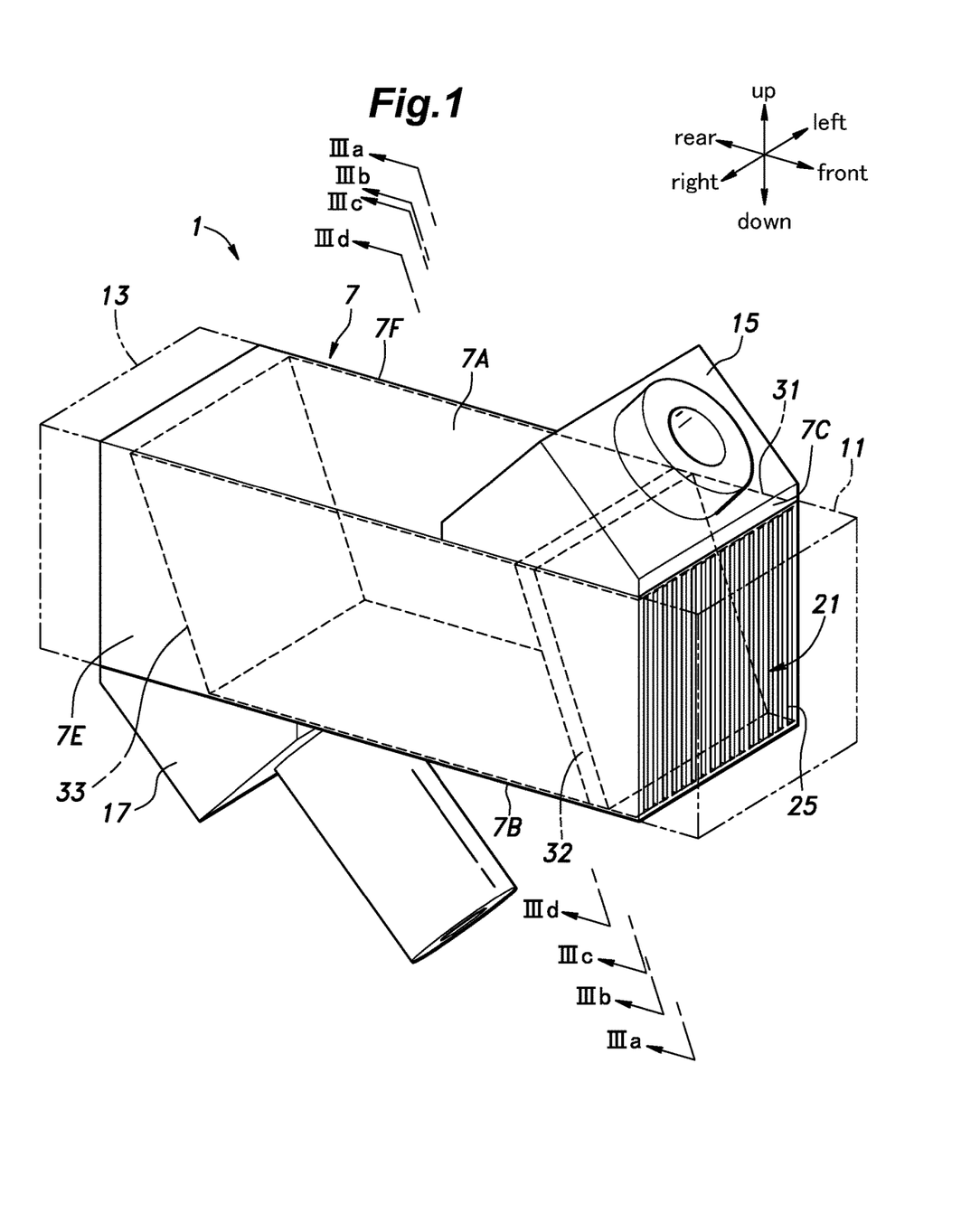
FIG. 1 is a perspective view showing a main part of a heat exchanger according to an embodiment of the present invention.

As shown in FIG. 1, a heat exchanger 1 is provided with a main body 7 configured to allow two fluids of different temperatures (a first fluid 3 and a second fluid 5: see FIG. 2) to flow therethrough. In the present embodiment, the main body 7 includes an outer shell having a substantially rectangular parallelepiped shape elongated in the fore and aft direction. As shown by a two-dot chain line in FIG. 1, a front portion and a rear portion of the main body 7 may be fitted with a fluid supply header 11 to which a first fluid 3 is supplied and a fluid discharge header 13 from which the first fluid 3 is discharged, respectively. Also, a front upper portion and a rear lower portion of the main body 7 are fitted with a fluid supply header 15 to which a second fluid 5 is supplied and a fluid discharge header 17 from which the second fluid 5 is discharged, respectively.

Each of the above components of the heat exchanger 1 may be made of a metal material (such as aluminum), for example.

The main body 7 is provided with multiple first flow paths 21 configured to allow the first fluid 3 to flow therethrough and multiple second flow paths 23 configured to allow the second fluid 5 that exchanges heat with the first fluid 3 to flow therethrough.

In a front surface 7C of the main body 7, inlets 25 of the respective first flow paths 21 open. These inlets 25 each have a slit shape extending in the vertical direction and are arranged at predetermined intervals in the lateral direction. The multiple inlets 25 are disposed substantially over the entirety of the front surface 7C. Though not shown in the drawings, in a rear surface of the main body 7, outlets of the respective first flow paths 21 open. These outlets have substantially the same structure (shape, arrangement, etc.) as the multiple inlets 25.

Figure 2:
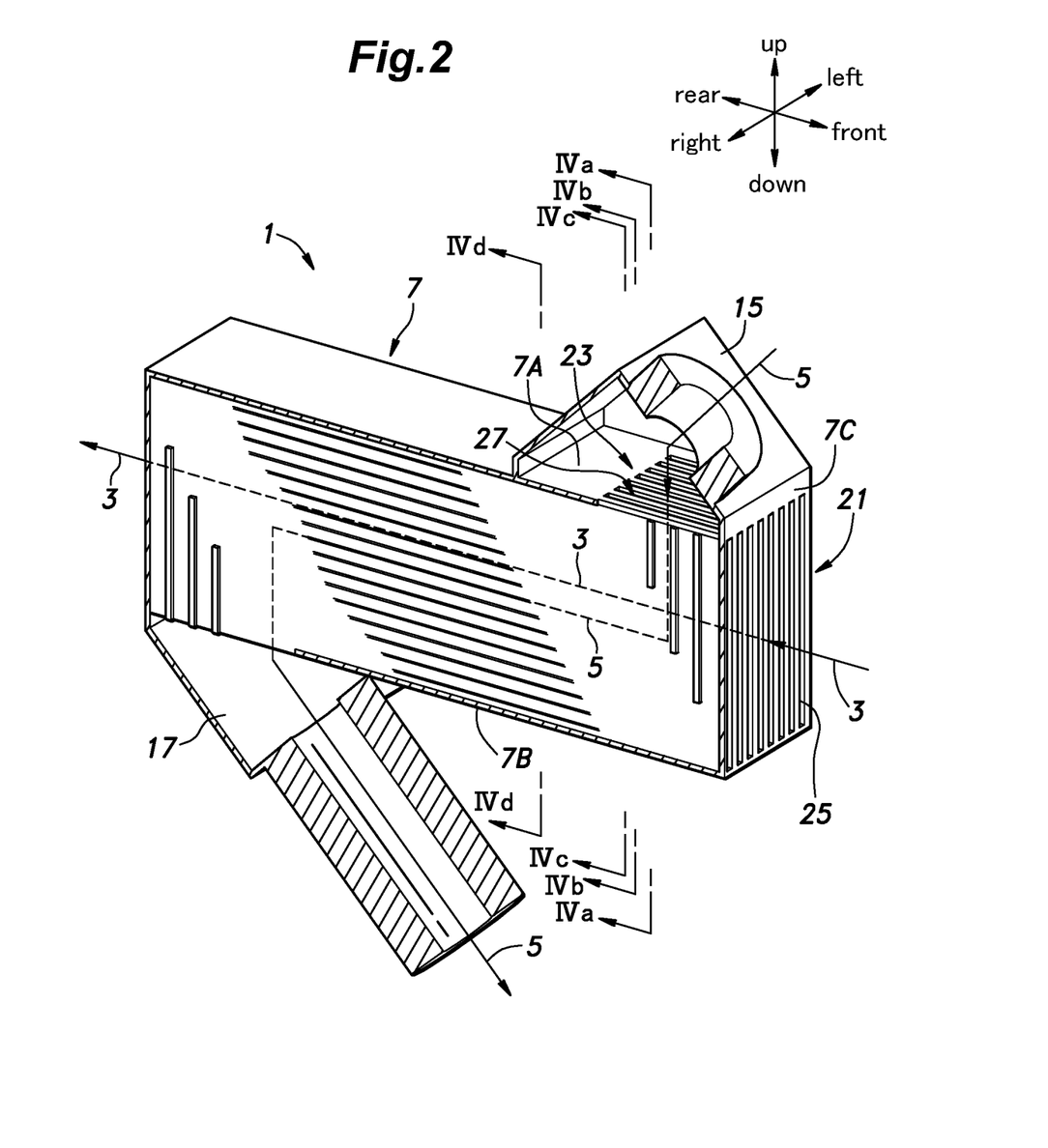
FIG. 2 is a vertical sectional view of the heat exchanger shown in FIG. 1.

As shown in FIG. 2, in an upper surface 7A of the main body 7, inlets 27 of the respective second flow paths 23 open. These inlets 27 each have a slit shape extending in the fore and aft direction and are arranged at predetermined intervals in the lateral direction. The multiple inlets 27 are locally provided in a front portion (a portion adjacent to the inlet 25 for the first fluid 3) of the upper surface 7A. Though not shown in the drawings, in a lower surface 7B of the main body 7, outlets of the respective second flow paths 23 open. These outlets have substantially the same structure as the multiple inlets 27.

As will be described in detail later, inside the main body 7, each second flow path 23 is disposed in a space between first flow paths 21 adjacent in the lateral direction.

As indicated by arrows in FIG. 2, the first fluid 3 supplied to the fluid supply header 11 is introduced into the main body 7 via the multiple inlets 25, thereafter flows rearward in the main body 7, and is discharged from the outlets provided in the rear surface of the main body 7 into the fluid discharge header 13. In other words, the flow direction of the first fluid 3 in the main body 7 (hereinafter referred to as the first flow direction) is a direction from the front inlets 25 to the rear outlets (the fore and aft direction).

As also indicated by arrows in FIG. 2, the second fluid 5 supplied to the fluid supply header 15 is introduced downward into the main body 7 via the multiple inlets 27, thereafter flows in the main body 7 from the front to the rear (namely, in the fore and aft direction), and is discharged downward from the outlets provided in the lower surface of the main body 7 into the fluid discharge header 17. In other words, the flow direction of the second fluid 5 at the inlets 27 of the main body 7 (hereinafter referred to as the second flow direction) is a downward direction (vertical direction). Similarly, the flow direction of the second fluid 5 at the outlets of the main body 7 is a downward direction (vertical direction).

Next, with reference to FIGS. 3A to 3D and FIGS. 4A to 4D, a variation of the flow path structure in the multiple first flow paths 21 will be described.

Each first flow path 21 includes an integrated part 31, a buffer part 32, and a divided part 33 that are arranged in this order from the inlet 25 for the first fluid 3 of the main body 7 in the first flow direction (here, from the front to the rear) (see FIG. 1).

Figure 3A:
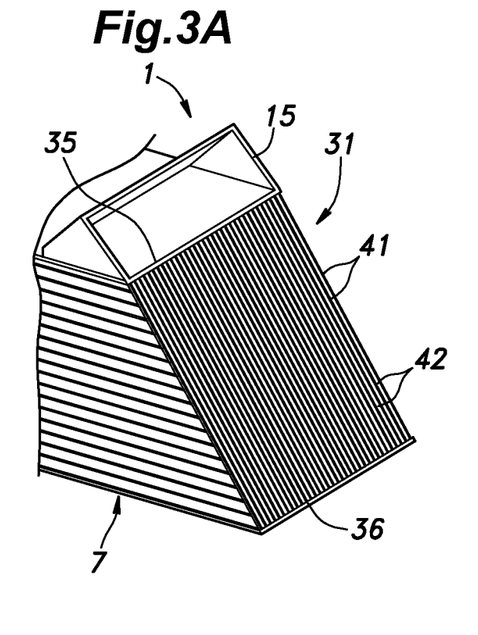
FIG. 3A is a cross section taken along line IIIa-IIIa of FIG. 1 showing a variation of a flow path structure in a first flow path.

FIG. 3A shows a cross section intersecting with the first flow direction and exposing the integrated parts 31 of the first flow paths 21 (a cross section taken along line of FIG. 1, which is inclined relative to the vertical direction to extend rearward and upward). The main body 7 is formed with multiple partition walls 41 extending in the vertical direction between the upper wall 35 and the lower wall 36 of the main body 7. In relation to the integrated parts 31, the multiple partition walls 41 in the cross section of FIG. 3A are substantially linear in the vertical direction and are arranged at predetermined intervals in the lateral direction. Thereby, the integrated part 31 of each first flow path 21 can be realized by a simple configuration.

In the cross section of FIG. 3A, the integrated part 31 of each first flow path 21 includes a single flow path space (hereinafter referred to as a first flow path space) 42 defined by a peripheral wall that includes a pair of partition walls 41, 41 disposed to face each other (namely, adjacent ones of the multiple partition walls 41). The first flow path space 42 substantially has a shape of a rectangle elongated in the vertical direction. An upper wall and a lower wall configuring the peripheral wall defining the first flow path space 42 jointly with the pair of partition walls 41, 41 are configured by the upper wall 35 and the lower wall 36 of the main body 7, respectively. It should be noted, however, that the upper wall and the lower wall configuring the peripheral wall may be provided separately from the upper wall 35 and the lower wall 36.

As shown by broken lines in FIG. 1, the integrated parts 31 are provided in a region of the main body 7 forming a substantially quadrangular prism-like shape on the front side thereof. In the region forming a substantially quadrangular prism-like shape, three rectangular side surfaces are disposed along the upper surface 7A, the lower surface 7B, and the front surface 7C of the main body 7, respectively, and two trapezoidal side surfaces are disposed along a right surface 7E and a left surface 7F of the main body 7, respectively. Therefore, the region of the integrated parts 31 in the multiple first flow paths 21 is wide in the fore and aft direction on the side of the inlets 27 for the second fluid 5 (on the side of the upper wall 35 of the main body 7) and is narrow in the fore and aft direction on the side remote from the inlets 27 (on the side of the lower wall 36 of the main body 7). At the inlets 25 for the first fluid 3, the entirety of each first flow path 21 is configured as the integrated part 31.

Figure 3B:
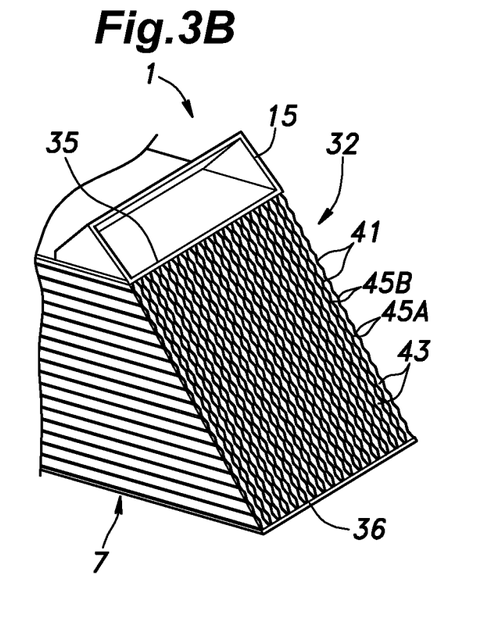
FIG. 3B a cross section taken along line IIIb-IIIb of FIG. 1 showing the variation of a flow path structure in a first flow path.
Figure 3C:
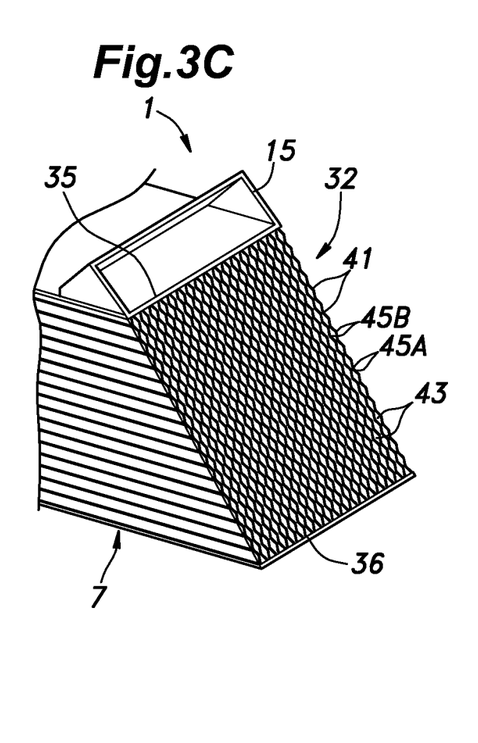
FIG. 3C is a cross section taken along line IIIc-IIIc of FIG. 1 showing the variation of a flow path structure in a first flow path.

FIGS. 3B and 3C show cross sections each intersecting with the first flow direction and exposing the buffer parts 32 of the first flow paths 21 (a cross section taken along line IIIb-Mb of FIG. 1 and a cross section taken along line IIIc-IIIc of FIG. 1, each line being inclined relative to the vertical direction to extend rearward and upward). The buffer part 32 of each first flow path 21 is connected to the rear of the corresponding integrated part 31. FIG. 3B shows a portion of the buffer parts 32 that is closer to the integrated part 31 than the portion of the buffer parts 32 shown in FIG. 3C is.

In the cross section of FIG. 3B, the buffer part 32 of each first flow path 21 includes a single deformed flow path space 43 formed by deforming the first flow path space 42 of the integrated part 31 shown in FIG. 3A. In the deformed flow path space 43, multiple pairs of first displacement parts 45A are provided on the pair of partition walls 41, 41 at predetermined intervals in the longitudinal direction of the pair of partition walls 41, 41 (substantially vertical direction), and the first displacement parts 45A of each pair are displaced in the lateral direction to approach each other from the state in the integrated part 31. Also, in the deformed flow path space 43, pairs of second displacement parts 45B are provided on the pair of partition walls 41, 41 at predetermined intervals in the longitudinal direction of the pair of partition walls 41, 41, and the second displacement parts 45B of each pair are displaced in the lateral direction to depart from each other from the state in the integrated part 31. In this way, the deformed flow path space 43 has an intermediate shape between the first flow path space 42 and a later-described divided flow path space 44.

The first displacement parts 45A and the second displacement parts 45B are arranged alternately in the longitudinal direction of each partition wall 41 (substantially vertical direction). As a result, in the buffer part 32, each partition wall 41 has a substantially sawtooth shape. It can be also said that the deformed flow path space 43 has a shape obtained by widening the first flow path space 42 of the integrated part 31 shown in FIG. 3A at some positions in the longitudinal direction and narrowing the same at some positions in the longitudinal direction.

In the buffer part 32, the magnitude of displacement of the first displacement parts 45A and the second displacement parts 45B varies gradually from the part connected with the integrated part 31 to the part connected with the divided part 33. In the part shown in FIG. 3C, which is closer to the divided part 33 than the part shown in FIG. 3B is, the first displacement parts 45A of each pair are closer to each other than in the state shown in FIG. 3B. Similarly, in FIG. 3C, the second displacement parts 45B of each pair are more distant from each other than in the state shown in FIG. 3B.

As shown by broken lines in FIG. 1, the buffer parts 32 are provided in a substantially parallelepiped-shaped region that is located behind the integrated parts 31 provided on the front side of the main body 7 and is disposed to have an upper surface positioned more rearward than a lower surface. Therefore, each buffer part 32 is formed to have substantially the same length in the fore and aft direction over the entirety of the main body 7 in the vertical direction. Thereby, the effect of the buffer part 32 (namely, the effect of suppressing occurrence of non-uniform flow due to transition from the integrated part 31 to the divided part 33 in the first flow path 21) can be obtained uniformly in the direction perpendicular to the first flow direction in the first flow path 21 (in the vertical direction in the illustrated embodiment), and this improves the homogeneity of the flow of the first fluid 3.

Figure 3D:
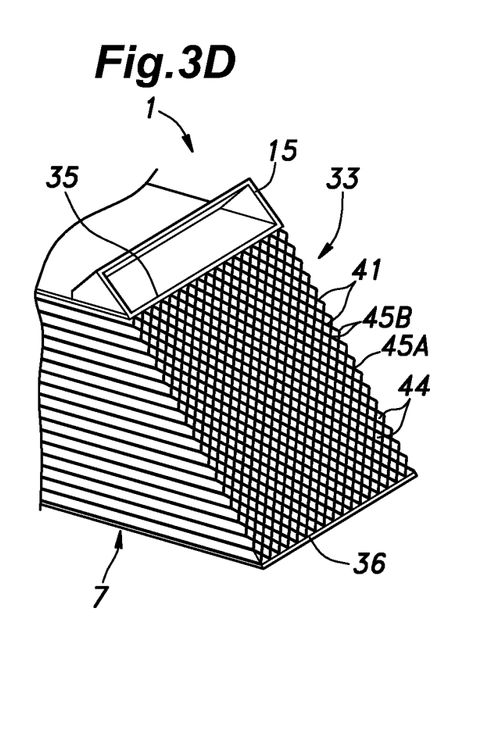
FIG. 3D is a cross section taken along line IIId-IIId of FIG. 1 showing the variation of a flow path structure in a first flow path.

FIG. 3D shows a cross section intersecting with the first flow direction and exposing the divided part 33 of each first flow path 21 (a cross section taken along line IIId-IIId of FIG. 1, which is inclined relative to the vertical direction to extend rearward and upward).

In each first flow path 21, the divided part 33 includes multiple divided flow path spaces 44 formed by dividing the first flow path space 42 of the integrated part 31 in the cross section of FIG. 3D. In the divided part 33, the first displacement parts 45A of each pair are further displaced from the state in the buffer part 32 so that they are connected to each other. Also, in the divided part 33, the second displacement parts 45B of each pair are further displaced from the state in the buffer part 32 so that each second displacement part 45B is connected to an opposing one of the second displacement parts 45B of a corresponding pair provided on an adjacent pair of partition walls 41, 41.

Each divided flow path space 44 has a shape of a rectangle (preferably, a shape of a square) disposed such that one diagonal line extends substantially along the vertical direction. The pair of first displacement parts 45A and the pair of second displacement parts 45B associated with each divided flow path space 44 are provided at positions corresponding to two sets of opposite corners of the rectangle, respectively. Each of the four corners of each divided flow path space 44 is connected with one of the four corners of another divided flow path space 44 via the partition wall 41 so that the multiple divided flow path spaces 44 form a grid.

As shown by broken lines in FIG. 1, the divided parts 33 are provided in a substantially parallelepiped-shaped region that is located behind the buffer parts 32 provided on the front side of the main body 7 and is disposed to have an upper surface positioned more rearward than a lower surface.

In this way, in the heat exchanger 1, each of the multiple first flow paths 21 through which the first fluid 3 flows is formed with the integrated part 31 that suppresses the pressure loss owing to the relatively wide first flow path space 42, the divided part 33 that improves the heat exchange efficiency owing to the relatively large heat transfer area, and the buffer part 32 that suppresses occurrence of non-uniform flow caused by transition from the integrated part 31 to the divided part 33 (namely, change of the flow path structure). Particularly, when the flow rate of the first fluid 3 is relatively high (namely, in the case of a high flow rate), the effect of suppressing the pressure loss is remarkable. Thereby, in the heat exchanger 1 in which the fluid flow path structure is configured to vary according to the position in the flow path, it is possible to improve the heat exchange efficiency while suppressing occurrence of non-uniform flow of fluid and pressure loss. In addition, the heat exchanger 1 can be made compact and lightweight.

The internal structure of the main body 7 has a rotationally symmetric structure. More specifically, the internal structure of the main body 7 is designed such that it remains substantially the same when rotated 180 degrees about a laterally extending axis that passes the center (center of gravity) of the main body 7. Thus, in the main body 7, each first flow path 21 includes another integrated part and another buffer part (both not shown in the drawings) that are arranged in this order from the outlet for the first fluid 3 in a direction opposite to the first flow direction (namely, from the rear to the front). Note that the divided part 33 is disposed at the center of the main body 7 in the fore and aft direction and is connected to both the buffer part 32 on the front side and the other buffer part on the rear side. With such a configuration, discharge of the first fluid 3 from the main body 7 becomes easy and the first fluid 3 can be discharged from the main body 7 uniformly over a wide range.

In the main body 7 configured as described above, the integrated parts 31, the buffer parts 32, the divided parts 33, or a combination thereof are included in an arbitrary cross section perpendicular to the first flow direction (the fore and aft direction) (hereinafter referred to as a vertical section). Also, since the integrated parts 31, the buffer parts 32, and the divided parts 33 are provided in regions of the main body 7 having a substantially quadrangular prism-like shape or a substantially parallelepiped shape as described above, depending on the position of the vertical section, the integrated parts 31, the buffer parts 32, and/or the divided parts 33 included in the vertical section may overlap each other in the vertical direction.

FIGS. 4A to 4D show partial vertical sections taken at different positions to show a part of the flow path structure of each first flow path 21 at the different positions (namely, cross sections taken along line IVa-IVa to line IVd-IVd in FIG. 2, respectively).

Figure 4A:
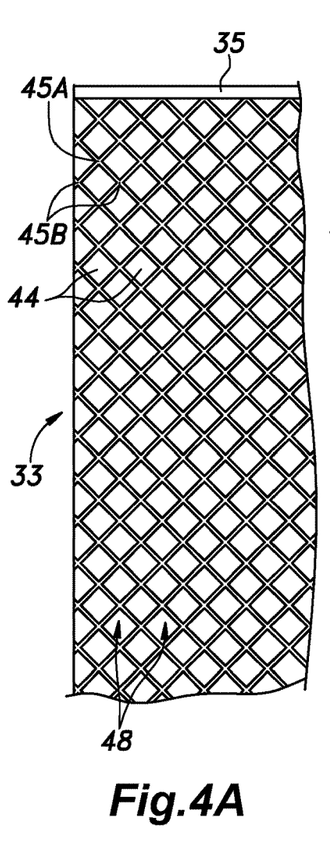
FIG. 4A is a partial vertical section taken along line IVa-IVa in FIG. 2 showing the variation of the flow path structure in the first flow path.

In the vertical section of FIG. 4A, the divided parts 33 (the divided flow path spaces 44) occupy the entire region in the vertical direction.

Figure 4B:
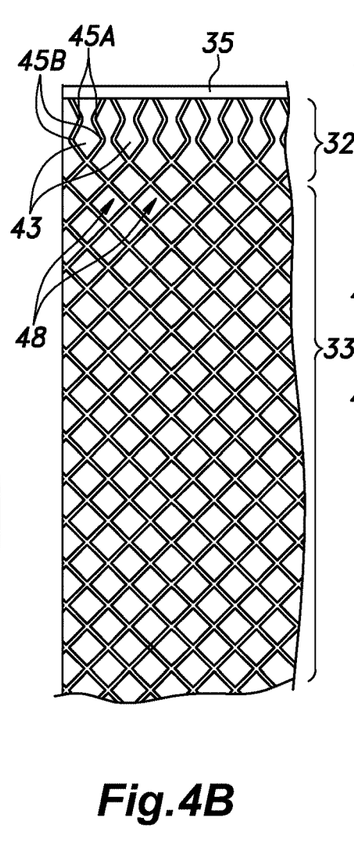
FIG. 4B is a partial vertical section taken along line IVb-IVb in FIG. 2 showing the variation of the flow path structure in the first flow path.

In the vertical section of FIG. 4B which is positioned more forward than the vertical section of FIG. 4A, the buffer parts 32 (the deformed flow path spaces 43) are disposed in an upper part region. In the vertical section of FIG. 4C taken at a position more forward than the vertical section of FIG. 4B, the buffer parts 32 (the deformed flow path space 43) having a shape varied from that shown in FIG. 4B are included.

As can be appreciated also from the substantially parallelepiped-shaped region of the buffer parts 32 shown in FIG. 1, when at least the buffer parts 32 are included in the vertical section of the main body 7, the closer the vertical section is to the inlets 25 for the first fluid 3, the more distant the buffer parts 32 are disposed from the inlets 27 for the second fluid 5. Thereby, in a region distant from the inlets 27 for the second fluid 5, the buffer part 32 of each first flow paths 21 positioned near the inlet 25 for the first fluid 3 suppresses occurrence of non-uniform flow. On the other hand, in a region close to the inlets 27 for the second fluid 5, the buffer part 32 of each first flow path 21 positioned relatively distant from the inlet 25 for the first fluid 3 enhances the directivity of the flow of the first fluid 3, whereby occurrence of turbulence and pressure loss in the first fluid 3 can be suppressed.

Figure 4C:
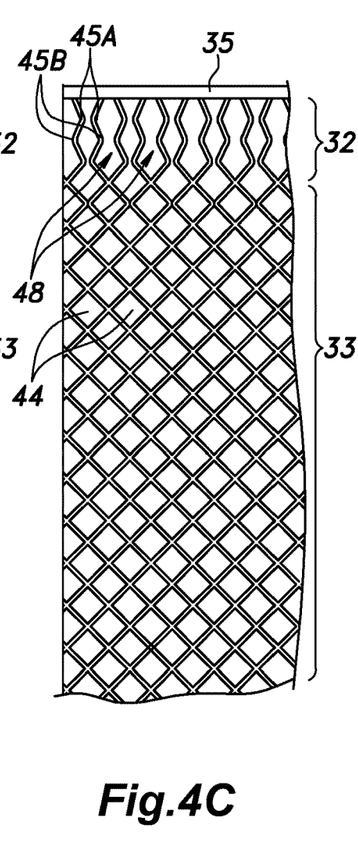
FIG. 4C is a partial vertical section taken along line IVc-IVc in FIG. 2 showing the variation of the flow path structure in the first flow path.

In the vertical section of FIG. 4D taken at a position more forward than the vertical section of FIG. 4C, the integrated parts 31 (the first flow path spaces 42) are disposed in an upper part region, and the buffer parts 32 are disposed below the integrated parts 31.

In this way, when at least the integrated parts 31 and the buffer parts 32 are included in the vertical section of the main body 7, the integrated parts 31 are disposed closer to the inlets 27 for the second fluid 5 (more upward) than the buffer parts 32 are. Also, when the integrated parts 31, the buffer parts 32, and the divided parts 33 are included in the vertical section of the main body 7, the integrated parts 31 and the buffer parts 32 are disposed closer to the inlets 27 for the second fluid 5 than the divided parts 33 are. Thereby, in a region adjacent to the inlets 27 for the second fluid 5, the integrated part 31 of each first flow path 21 secures a wider first flow path space 42, whereby smooth flow of the first fluid 3 can be ensured and as a result, heat exchange between the first fluid 3 and the second fluid 5 can be promoted.

Figure 4D:
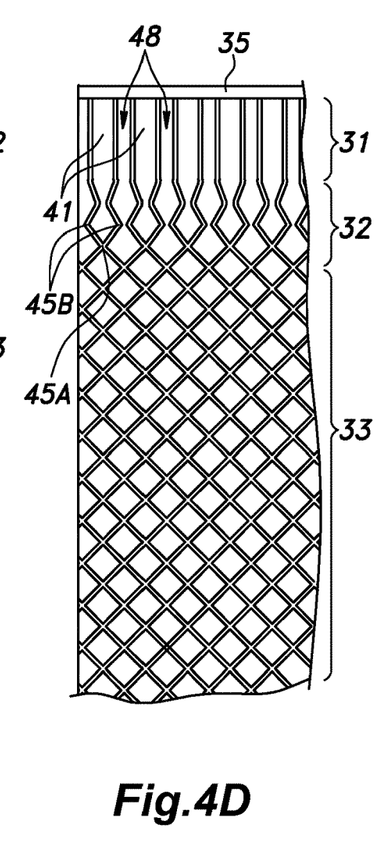
FIG. 4D is a partial vertical section taken along line IVd-IVd in FIG. 2 showing the variation of the flow path structure in the first flow path.

Though the illustration is omitted, in a vertical section at a position more forward than the vertical section shown in FIG. 4D, the ratio of an area occupied by the integrated parts 31 increase further, and eventually, in the vicinity of the inlets 25 of the main body 7, only the integrated parts 31 are disposed over the entire region. In other words, the closer the vertical section (arbitrary cross section) is to the inlets 25 for the first fluid 3, the greater the ratio of the area occupied by the integrated part 31 in the vertical section is. Thereby, in a part of each first flow path 21 close to the inlet 25 for the first fluid 3, the integrated part 31 secures a wide first flow path space 42, whereby the introduction of the first fluid 3 into the main body 7 becomes easy and the first fluid 3 can be introduced into the main body 7 uniformly over a wide range.

As shown in FIGS. 4A to 4D, the multiple second flow paths 23 include multiple flow path spaces (hereinafter referred to as second flow path spaces) 48 defined by surfaces of pairs of partition walls 41, 41 opposite from the respective first flow paths 21. The second fluid 5 is supplied in the second flow direction perpendicular to the first flow direction from the inlets 27 for the second fluid communicating with the second flow path spaces 48 in the main body 7. Thereby, each of the multiple first flow paths 21 can be formed with the integrated part 31, the buffer part 32, and the divided part 33 without complicating the structure of the multiple second flow paths 23.

Preferably, each second flow path space 48 includes a part extending from the inlet 27 for the second fluid 5 over the entirety of the main body 7 in the second flow direction (the vertical direction). Thereby, the second fluid 5 can be guided smoothly from the inlet 27 over the entirety of the main body 7 in the second flow direction.

Figure 5A:
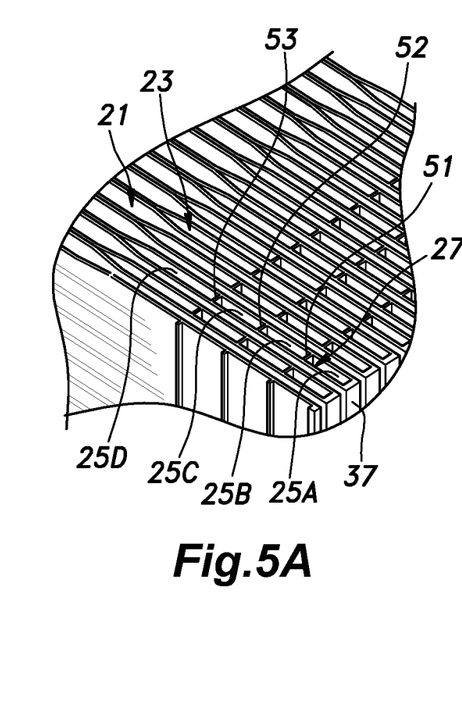
FIG. 5A is a first explanatory diagrams showing a flow path structure in a second flow path.
Figure 5B:
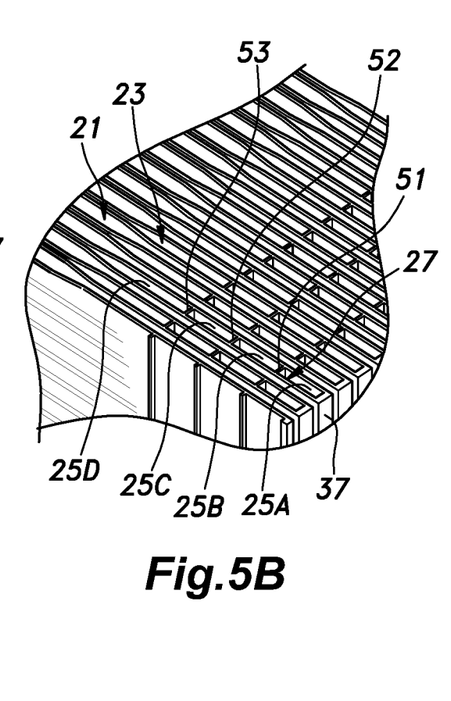
FIG. 5B is a first explanatory diagrams showing a flow path structure in a second flow path at a different position.
Figure 5C:
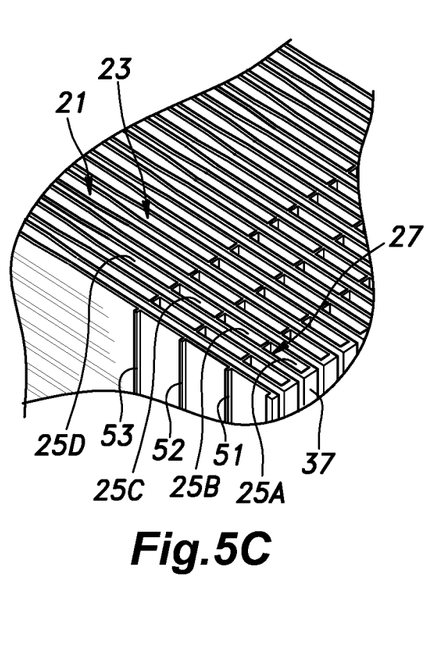
FIG. 5C is a first explanatory diagrams showing a flow path structure in a second flow path at another position.
Figure 6:
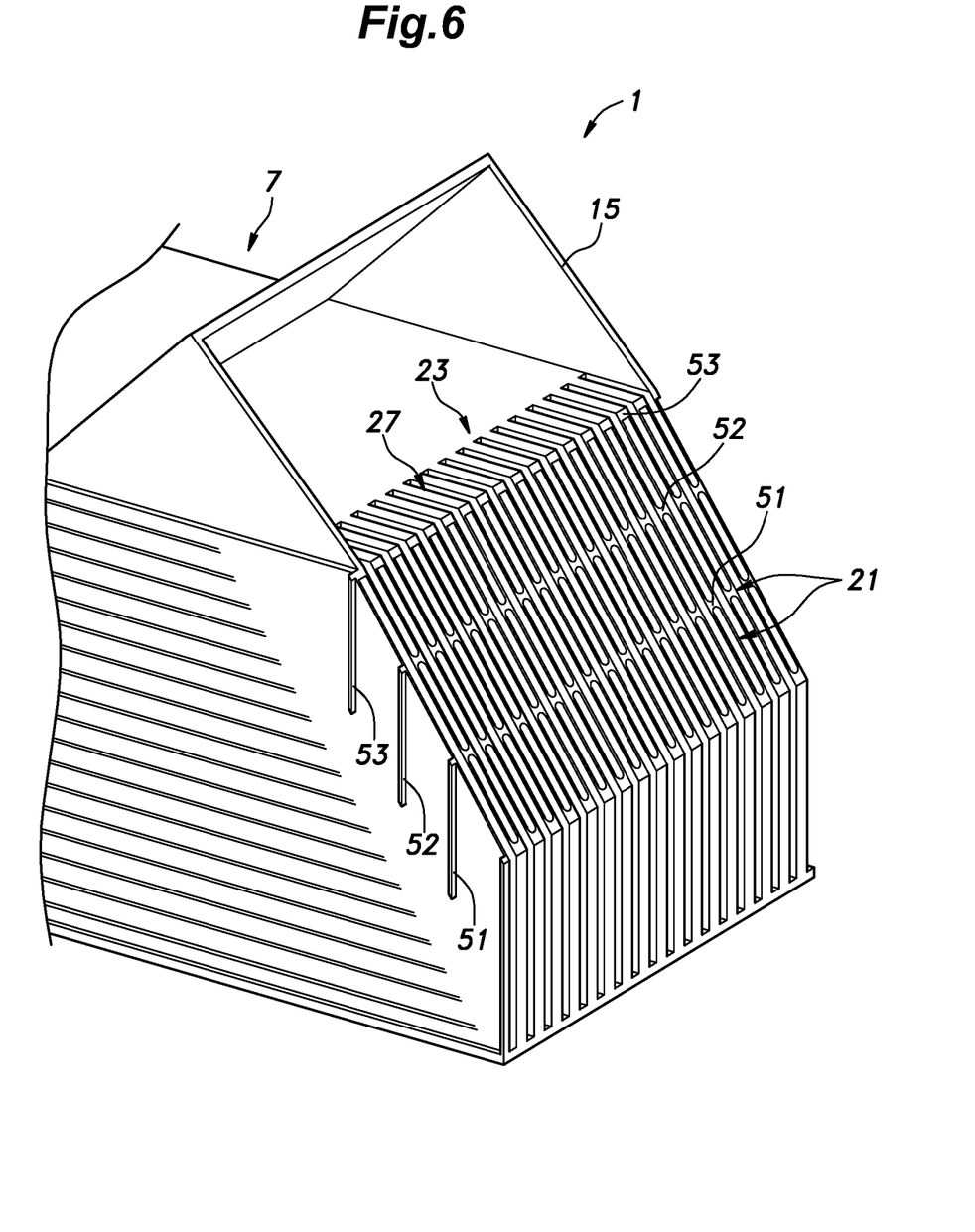
FIG. 6 is a second explanatory diagram showing the flow path structure in the second flow path.

Next, with reference to FIGS. 5A to 5C and FIG. 6, flow path structure of the multiple second flow paths 23 will be described. FIGS. 5A to 5C show cross sections of the main body 7 perpendicular to the second flow direction at different vertical positions. These cross sections show the flow path structure of the second flow paths 23 near the inlets 27 for the second fluid 5 of the main body 7. FIG. 6 shows a cross section intersecting with the first flow direction and exposing the inlet 27 of each second flow path 23 (a cross section inclined upward and rearward relative to the vertical direction).

The position of the cross section of FIG. 5A substantially corresponds to the position of a pair of first displacement parts 45A in an upper portion of the divided part 33 (the divided flow path space 44) shown in FIG. 4A, for example. The positions of the cross sections of FIGS. 5B and 5C substantially correspond to positions between a pair of first displacement parts 45A and a pair of second displacement parts 45B adjacent thereto in the upward direction in an upper portion of the divided part 33 (the divided flow path space 44) shown in FIG. 4A, for example, where the cross section of FIG. 5C is positioned closer to the pair of second displacement parts 45B than the cross section of FIG. 5B is.

As shown in FIGS. 2, 5A to 5C, and 6, in a front upper portion of the main body 7, multiple (here, three) dividing walls 51-53 extending in the second flow direction from the inlets 25 of the second flow paths 23 are provided. Thereby, the inlet 25 of each second flow path 23 has multiple inlet openings 25A-25D divided by the dividing walls 51-53 in the fore and aft direction. Thereby, the second fluid 5 can be introduced into the main body 7 uniformly in the direction perpendicular to or intersecting with the first flow direction (here, the fore and aft direction).

The dividing walls 51-53 are formed such that the lengths thereof become shorter toward the first flow direction (rearward) from the side of the inlets 25 for the first fluid 3 of the main body 7 (in the illustrated embodiment, the length of the dividing wall 51>the length of the dividing wall 52>the length of the dividing wall 53). Thereby, it is possible to make the second fluid 5 flow uniformly within the main body 7 in the direction perpendicular to the first flow direction (in the vertical direction). Note that instead of the dividing walls 51-53, projections protruding from surfaces of the pairs of partition walls 41, 41 opposite from the respective first flow paths 21 may be provided so as to divide the multiple second flow path spaces 48 in the fore and aft direction (the first flow direction).

The second fluid 5 introduced into the main body 7 from the inlet opening 25A flows downward while the flow thereof in the fore and aft direction being restricted by the dividing wall 51 and the front wall 37 of the main body 7. When the second fluid 5 introduced from the inlet opening 25A passes the tip (the lower end) of the dividing wall 51, the second fluid 5 becomes able to flow rearward, and thereafter the second fluid 5 flows toward the outlet of the second flow path 23 provided in the rear lower portion of the main body 7.

The second fluid 5 introduced into the main body 7 from the inlet opening 25B flows downward while the flow thereof in the fore and aft direction being restricted by the dividing wall 51 and the dividing wall 52. When the second fluid introduced from the inlet opening 25B passes the tip (the lower end) of the dividing wall 52, the second fluid 5 becomes able to flow rearward, and thereafter the second fluid 5 flows toward the outlet of the second flow path 23 provided in the rear lower portion of the main body 7.

The second fluid 5 introduced into the main body 7 from the inlet opening 25C flows downward while the flow thereof in the fore and aft direction being restricted by the dividing wall 52 and the dividing wall 53. When the second fluid introduced from the inlet opening 25C passes the tip (the lower end) of the dividing wall 53, the second fluid 5 becomes able to flow rearward, and thereafter the second fluid 5 flows toward the outlet of the second flow path 23 provided in the rear lower portion of the main body 7.

The flow of the second fluid 5 introduced into the main body 7 from the inlet opening 25D is restricted only in the forward direction by the dividing wall 53 and not in the rearward direction. The second fluid 5 introduced from the inlet opening 25D flows toward the outlet of the second flow path 23 provided in the rear lower portion of the main body 7 while spreading rearward immediately after introduction into the main body 7.

In the manufacture of the heat exchanger 1 having the above-described structure, at least the main body 7 may be integrally molded using known 3D printing technology (additive manufacturing). The concrete processing method used in additive manufacturing is not particularly limited so long as the above-described structure can be achieved. For example, the heat exchanger 1 is molded by simultaneously jetting the metal powder and irradiating laser (or electron beam) onto a target part to form layers of molten metal powder in the aforementioned shape.

A concrete embodiment has been described in the foregoing, but the present invention is not limited to the above embodiment and may be modified or altered in various ways.

For example, the outer shape (the outer shell) of the main body 7 of the heat exchanger 1 is not limited to a rectangular parallelepiped shape as described above, and another shape (for example, cylindrical) may be adopted. Also, the heat exchanger 1 may be configured such that the second fluid 5 flows from the outlet side to the inlet 27 side of the above-described second flow path 23. The number of the first flow paths 21 and the number of the second flow paths 23 may be changed as appropriate. Also, the shapes of the first and second flow path spaces, the deformed flow path space, and the divided flow path space are not limited to the above-described example and may be modified or altered in various ways. For example, the divided flow path space may have a star shape of a hexagonal shape. The heat exchanger 1 may be used in an exhaust gas recirculation (EGR) cooler, for example.

The invention claimed is:
1. A heat exchanger comprising:
 a main body including an outer shell having a substantially rectangular parallelepiped shape elongated in a fore and aft direction, the main body having a front surface disposed orthogonally in the fore and aft direction and a rear surface opposite the front surface;

multiple first flow paths extending along the fore and aft direction in the main body such that a first fluid flows therethrough; and multiple second flow paths provided in the main body such that a second fluid that exchanges heat with the first fluid flows therethrough, wherein each first flow path includes an integrated part, a buffer part, and a divided part that are arranged in this order from an inlet for the first fluid of the main body in a first flow direction, the inlet being opened in the front surface of the main body, the integrated part includes a single first flow path space defined by a peripheral wall that includes a pair of partition walls disposed to face each other in a cross section perpendicular to or intersecting with the first flow direction, the buffer part includes a single deformed flow path space formed by deforming the first flow path space such that first displacement parts of each of multiple pairs of first displacement parts that are provided at intervals on the pair of partition walls approach each other in a cross section perpendicular to or intersecting with the first flow direction, the divided part includes multiple divided flow path spaces formed by dividing the first flow path space in a cross section perpendicular to or intersecting with the first flow direction by connecting the first displacement parts of each pair of first displacement parts to each other, the integrated part, the buffer part, the divided part, or a combination thereof are included in each first flow path in an arbitrary cross section of the main body perpendicular to the first flow direction, and the closer each first flow path is to the inlet for the first fluid, the greater a ratio of an area occupied by the integrated part in each first flow path is.

2. The heat exchanger according to claim 1, wherein the multiple second flow paths include second flow path spaces defined by surfaces of the pairs of partition walls opposite from the respective first flow paths, and the second fluid is supplied in a second flow direction perpendicular to the first flow direction from an inlet for the second fluid communicating with the second flow path spaces in the main body.

3. The heat exchanger according to claim 2, wherein when at least the integrated parts and the buffer parts are included in the arbitrary cross section of the main body, the integrated parts are disposed closer to the inlet for the second fluid than the buffer parts are, and when the integrated parts, the buffer part, and the divided parts are included in the arbitrary cross section of the main body, the integrated parts and the buffer parts are disposed closer to the inlet for the second fluid than the divided parts are.

4. The heat exchanger according to claim 2, wherein the inlet for the second fluid is provided in a part of the main body adjacent to the inlet for the first fluid which is an upstream side in the first flow direction, and when at least the buffer parts are included in the arbitrary cross section of the main body, the closer the arbitrary cross section is to the inlet for the first fluid, the more distant the buffer parts are disposed from the inlet for the second fluid.

5. The heat exchanger according to claim 1, wherein each buffer part is formed to have substantially a same length in the first flow direction over an entirety of the main body in a direction perpendicular to the first flow direction.

6. The heat exchanger according to claim 2, wherein each second flow path space includes a part extending from the inlet for the second fluid over an entirety of the main body in the second flow direction.

7. The heat exchanger according to claim 2, wherein the main body is provided with one or multiple dividing walls perpendicular to or intersecting with the first flow direction so as to divide the multiple second flow path spaces in the first flow direction.

8. The heat exchanger according to claim 7, wherein the multiple dividing walls are formed such that lengths thereof become shorter toward the first flow direction from a side of the inlet for the first fluid of the main body.

9. The heat exchanger according to claim 1, wherein each first flow path includes another integrated part and another buffer part arranged in this order from an outlet for the first fluid of the main body in a direction opposite to the first flow direction.

10. The heat exchanger according to claim 1, wherein the buffer part includes the single deformed flow path space formed by deforming the first flow path space such that second displacement parts of each of multiple pairs of second displacement parts that are provided at intervals on the pair of partition walls depart from each other in a cross section perpendicular to or intersecting with the first flow direction.

11. The heat exchanger according to claim 10, wherein each divided flow path space has a shape of a rectangle in a cross section perpendicular to or intersecting with the first flow direction, and each pair of first displacement parts and each pair of second displacement parts are provided at positions corresponding to two sets of opposite corners of the rectangle, respectively.

12. The heat exchanger according to claim 1, wherein in the integrated part, the pair of partition walls extend linearly and are disposed parallel to each other in a cross section perpendicular to or intersecting with the first flow direction.

13. The heat exchanger according to claim 2, wherein the main body is provided with projections protruding from surfaces of the pairs of partition walls opposite from the respective first flow paths so as to divide the multiple second flow path spaces in the first flow direction.

14. A heat exchanger comprising:
a main body including an outer shell having a substantially rectangular parallelepiped shape elongated in a fore and aft direction, the main body having a front surface disposed orthogonally in the fore and aft direction and a rear surface opposite the front surface;

multiple first flow paths extending along the fore and aft direction in the main body such that a first fluid flows therethrough; and multiple second flow paths provided in the main body such that a second fluid that exchanges heat with the first fluid flows therethrough, wherein each first flow path includes an integrated part, a buffer part, and a divided part arranged in this order from an outlet for the first fluid of the main body in a direction opposite to a first flow direction which is a flow direction of the first fluid, the outlet being opened in the rear surface of the main body, the integrated part includes a single first flow path space defined by a peripheral wall that includes a pair of partition walls disposed to face each other in a cross section perpendicular to or intersecting with the first flow direction, the buffer part includes a single deformed flow path space formed by deforming the first flow path space such that first displacement parts of each of multiple pairs of first displacement parts that are provided at intervals on the pair of partition walls approach each other in a cross section perpendicular to or intersecting with the first flow direction, the divided part includes multiple divided flow path spaces formed by dividing the first flow path space in a cross section perpendicular to or intersecting with the first flow direction by connecting the first displacement parts of each pair of first displacement parts to each other, the integrated part, the buffer part, the divided part, or a combination thereof are included in each first flow path in an arbitrary cross section of the main body perpendicular to the first flow direction, and the closer each first flow path is to the outlet for the first fluid, the greater a ratio of an area occupied by the integrated part in each first flow path is.

\* \* \* \* \*